United States Patent [19]

Grazia

[11] 3,857,103

[45] Dec. 24, 1974

[54] SYSTEM AND DEVICE TO COMPARE THE PHASE AND FREQUENCY BETWEEN ELECTRICAL SIGNALS

[76] Inventor: Gianni Grazia, c/o Telettra, Via Trento, 30, 20059 Vimercate-Milan, Italy

[22] Filed: Dec. 7, 1972

[21] Appl. No.: 312,964

[30] Foreign Application Priority Data

Dec. 10, 1971 Italy .............................. 32204/71

[52] U.S. Cl.................. 328/133, 307/232, 307/233, 307/237

[51] Int. Cl. .......................................... H03d 13/00

[58] Field of Search.................... 307/232, 233, 237; 328/133, 134

[56] References Cited

UNITED STATES PATENTS 3,657,659 4/1972 Johnson ............................ 307/232

3,723,889 3/1973 Oberst ................................ 307/233

*Primary Examiner*—Rudolph V. Rolinec
*Assistant Examiner*—William D. Larkins
*Attorney, Agent, or Firm*—Hubbell, Cohen & Stiefel

[57] ABSTRACT

A system for comparing the phase and frequency between a pair of periodic signals which are converted to pulse trains, such as by squaring circuits, processed in separate channels to clock these signals which undergo cycle suppression in common, as well as decoding the clocked pulse trains which decoded signals are provided to a flip-flop and subsequently to a converter which relates the potential value of output signal to the phase difference between the periodic input signals in accordance with a non-decreasing monotonic function which is linear between a maximum and minimum value above or below, respectively, a phase difference greater than or less than the phase difference corresponding to said respective maximum and minimum output potential values.

3 Claims, 7 Drawing Figures

SYSTEM AND DEVICE TO COMPARE THE PHASE AND FREQUENCY BETWEEN ELECTRICAL SIGNALS

BACKGROUND OF THE INVENTION

1. Field of the Invention

The present invention particularly relates to a system for discriminating frequency and measuring a phase difference between periodic signals in accordance with a non-decreasing monotonic function.

2. Description of the Prior Art

Systems and comparators for comparing phase and frequency between periodic signals are well known. Such prior art systems are of many different types with the most prevalent type, such as that utilized for comparing a pair of periodic signals having frequencies $f_1$ and $f_2$, respectively, where $f_2 = f_1 + X$, providing a sawtooth wave output signal which decreases to a minimum valve at a frequency of $X$, where $X = f_2 - f_1$. However, such prior art comparators are not satisfactory when utilized in networks having mutually synchronized oscillators, such as disclosed in U.S. Pat. Nos. 2,986,723 and 3,050,586, and a 1969 article by Irwin Sandberg in Vol. 9 of the BSTJ, starting on page 2978, by way of example. The present invention, however, overcomes the disadvantages of the prior art such as in such applications.

SUMMARY OF THE INVENTION

A system is provided for comparing the phase and frequency between a pair of periodic signals which are converted to pulse trains, such as by squaring circuits. These converted signals are processed in separate channels to clock these signals which undergo cycle suppression in common, the clock pulse trains being decoded and provided to a flip-flop and subsequently to a converter which relates to the potential value of the output signal to the phase difference between the periodic input signals in accordance with a non-decreasing monotonic function which is linear between a maximum and minimum above or below, respectively, a phase difference greater than or less than the phase difference corresponding to said respective maximum and minimum output potential values.

This system according to the invention has the contemporaneous function of both frequency discriminator and phase comparator, since it provides an output proportional to the phase difference between the two input signals until the absolute value of this difference exceeds a fixed maximum value $\Delta\phi$max, at which time the output thereafter remains at constant value. Therefore, if signals having different frequencies ($f_1$, $f_2$) are provided at the input to the system, the output level will vary linearly until the maximum or minimum value is reached depending on the sign, the relationship being $\Delta f = f_1 - f_2$.

In the system of the present invention, the phase difference between the compared signals is converted to a final output signal in accordance with the previously mentioned non decreasing monotonic characteristic. A linearly variable voltage is produced in response to the variation in the phase difference as long as such variation occurs in a predetermined interval between a preestablished maximum and minimum value, while for values of this difference occurring outside of this predetermined interval, the voltage remains constant even when there are unlimited increases in this phase difference.

This invention also comprises a phase and frequency comparator device suitable for realizing the previous system, such a device including a channel for each signal, each channel consisting of a possible squaring circuit, a multi-stage counter and a decoder; and as elements in common to the channels, a comparator circuit, a set-reset register of flip-flops, a pulse suppressor circuit and a circuit capable of providing an analog signal which is proportional to the number of "ones" contained in the flip-flop register. The different aspects and advantages of the invention as well as its different embodiments will be better understood by reference to the following description when taken in conjunction with the following drawings wherein:

DETAILED DESCRIPTION OF THE PREFERRED EMBODIMENTS

Figures 1, 5A, 5B, 5C:
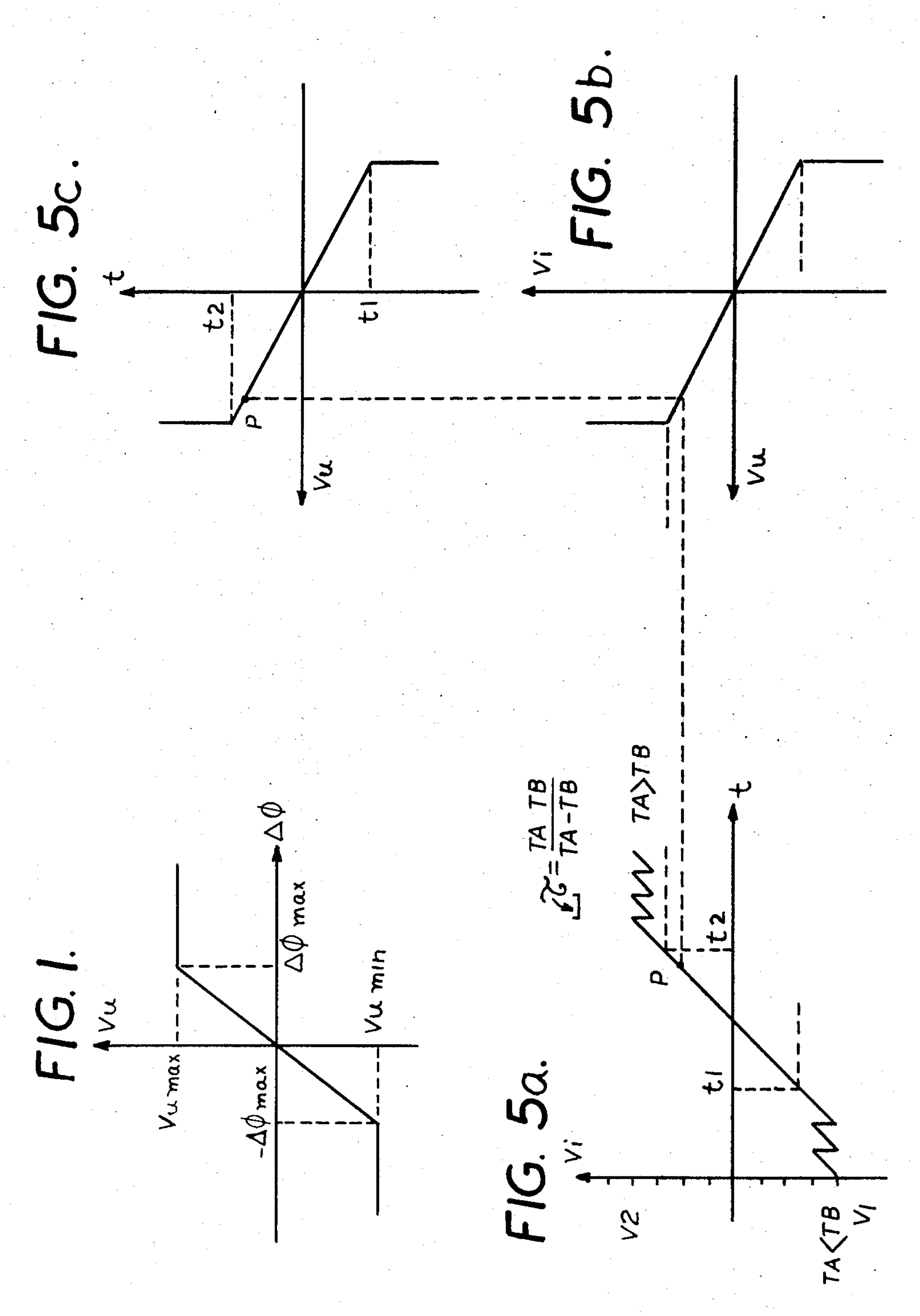
FIG. 1 is a graphical illustration of the preferred monotonic non-decreasing characteristic with which the phase difference between input signals is related to the final output signal in accordance with the present invention.

Referring now to the drawings in detail, and initially to FIG. 1, which is a graphical illustration of the preferred monotonic non-decreasing characteristic with which the phase difference between input signals is related to the final output signal in accordance with the present invention, the phase difference $\Delta\phi$ between signals A and B which are to be compared appears on the absicca or X axis and the comparator device output voltage appears on the ordinate or Y axis. As shown and preferred, as long as the signal B phase $\phi_B$ is higher than the signal A phase $\phi_A$ by at least an amount $\Delta\phi_{max}$, the output voltage V$u$ reaches its maximum value +V$u$ max and remains constant at this value even if $\phi_B$ continuously increases with respect to $\phi_A$. Similarly, when $\phi_B$ is lower than $\phi_A$ by at least an amount $-\Delta\phi_{max}$, the output voltage will assume the V$u$ minimum value and will remain steady at this level even if $\phi_B$ continuously decreases with respect to $\phi_A$. For values of $\Delta\phi$ falling between $+\Delta\phi_{max}$ and $-\Delta\phi_{max}$, the output voltage V$u$ will vary linearly between V$u$ min and V$u$ max as $\Delta\phi$ varies. Thus, the phase and frequency comparator device (FIGS. 2 and 3) output voltage in accordance with the present invention is preferably related to the phase difference of the two input signals A and B in accordance with a preferred non-decreasing monotonic characteristic of the type illustrated in FIG. 1.

Figure 2:
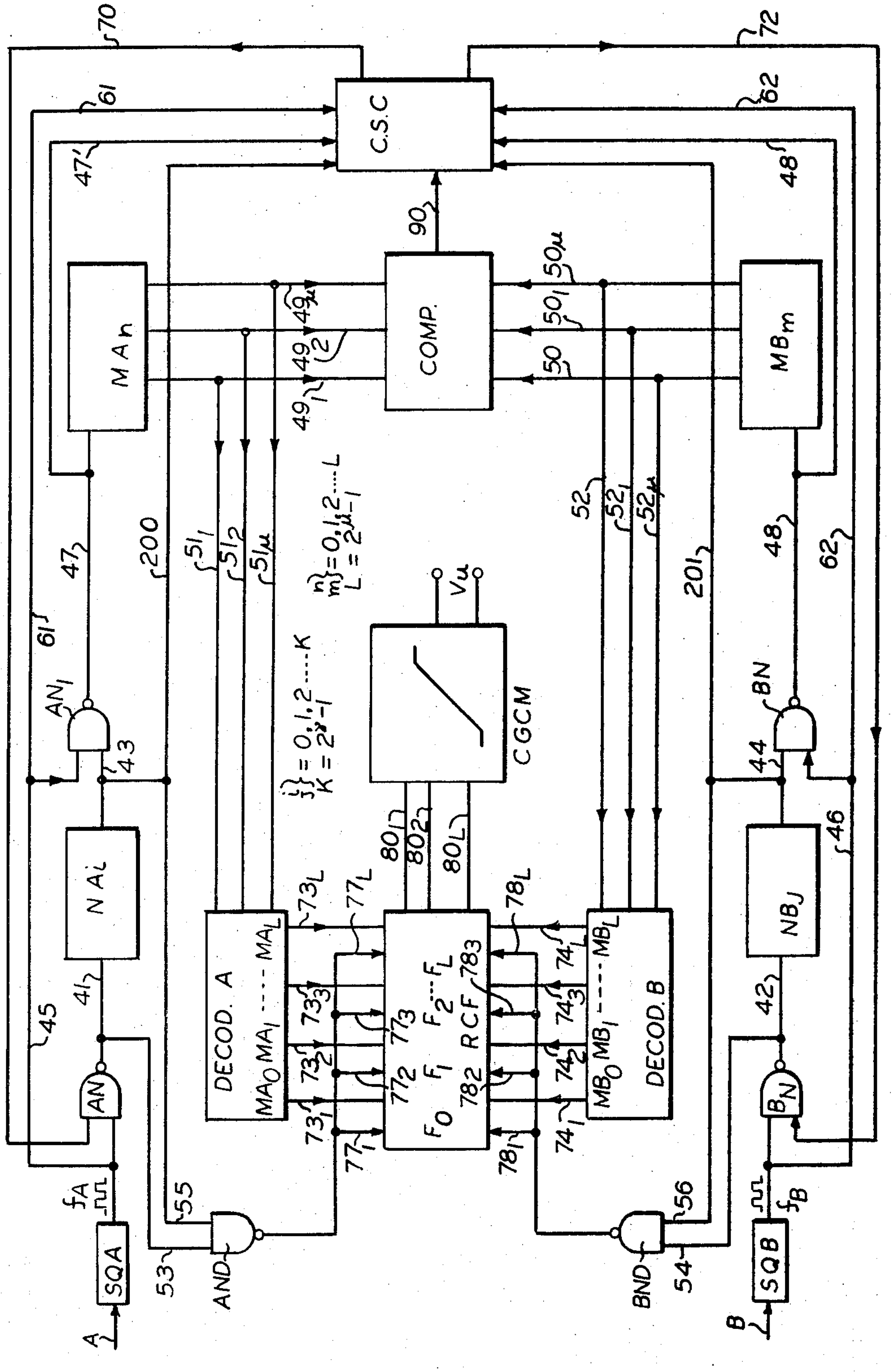
FIG. 2 is a block diagram of the preferred embodiment of the preferred system in accordance with the present invention.
Figure 3:
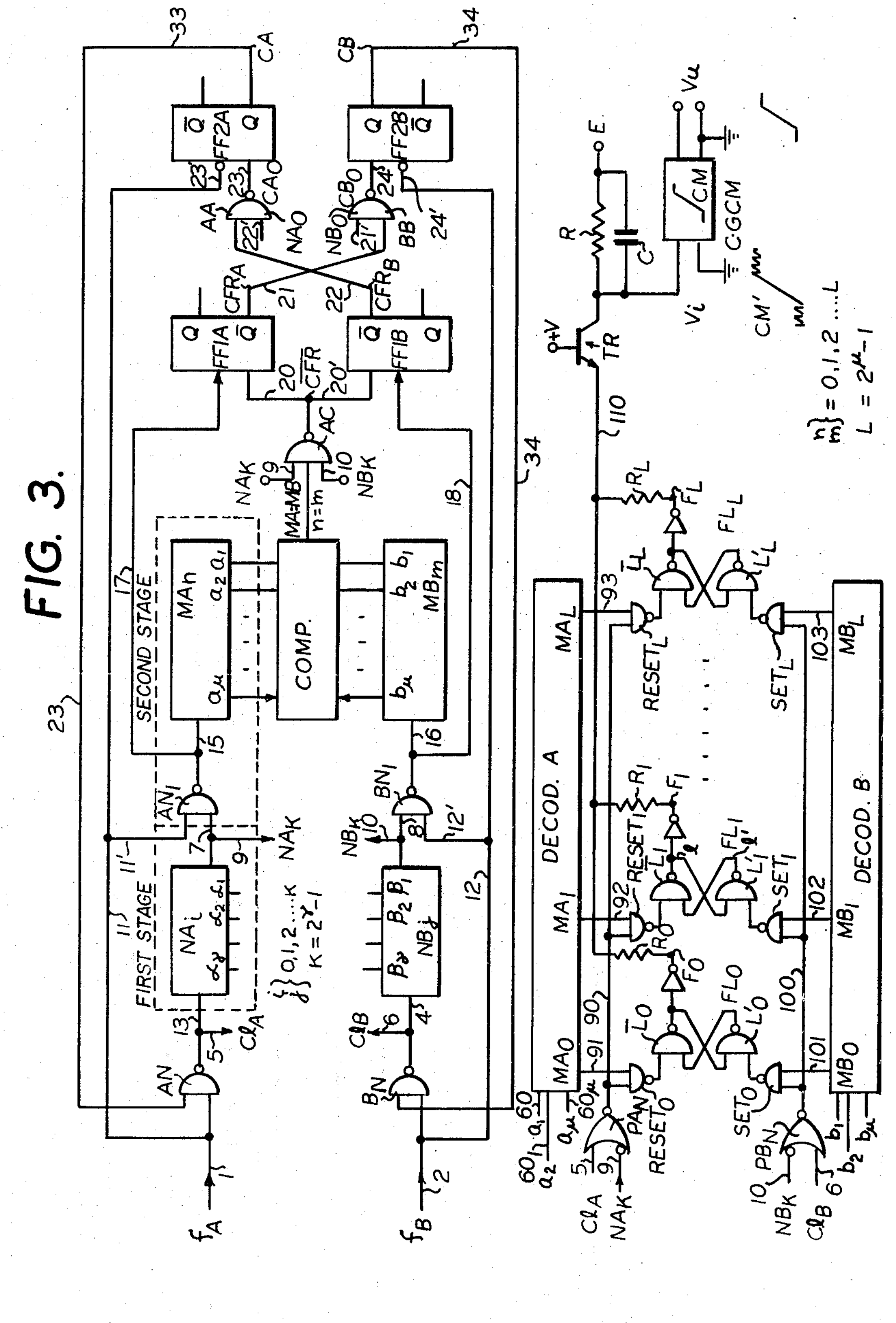
FIG. 3 is a more detailed block diagram of the preferred embodiment of the comparator device shown in FIG. 2.

Referring now to FIG. 2, a block diagram of the preferred system of the present invention is shown. As previously mentioned by way of example, the signals whose frequencies are to be compared are termed A and B, respectively. These signals A and B are preferably periodic signals from which pulse trains $f_A$ and $f_B$ (FIG. 4) are obtained by the squaring devices SQA and SQB. Each train $f_A$ and $f_B$ respectively is conveyed to a gate $A_N$ and $B_N$ respectively, illustratively shown as a NAND gate, whose output signal (lines 41, 42) moves the corresponding counter chain $Na_i$, $MA_n$ for gate $A_N$, and $NB_j$, $MB_m$, for gate $B_N$, the respective counter chains supplying the time framing (temporization) used by each half circuit. According to a preferred and particular feature of the invention, the counter chains $NA_i$, $MA_n$, and $NB_j$, $MB_m$, respectively, are in two stages N and M, and the first stage N splits in a number of phases each M state (FIG. 3). Chain $NA_i$ is connected to the $MA_n$ chain through NAND gate $AN_l$, line 43 connecting the output of the $NA_i$ chain to the input of gate $AN_l$ and line 47 connecting the output of gate $AN_l$ to the input of the $MA_n$ chain. Similarly, chain $NB_j$ is connected to the $MB_n$ chain through NAND gate $BN_l$, line 44 connecting the output of the $NB_j$ chain to the input of gate $BN_l$ and line 48 connecting the output of $BN_l$ to the input of the $MB_m$ chain. Stages $MA_n$ and $MB_m$ provide inputs in parallel to a comparator COMP through output lines 49, $49_1$ . . . $49\mu$ from counter $MA_n$ and through output lines 50, $50_1$, $50\mu$ from counter $NB_m$. These output signals from counters $MA_n$ and $MB_m$ are also provided in parallel as an input, through lines $51_1$, $51_2$, $51\mu$ , and 52, and $52\mu$ , respectively, to decoders DECOD. A and DECOD. B, respectively, such as the type designated SN 74,154 on pages 9–160 and 9–161 of the Texas Instruments Semiconduction Components Data Book II—Digital IC, July, 1971, or the type designated 9321 decoder by Fairchild Semiconductor and described on pages 8–111 and 8–112 of the June 19, 1972 Fairchild Semiconductor TTL Data Book. The comparator COMP. provides an output signal that is sent through line 90 to a cycle suppressor device C.S.C. where it also receives input pulse trains $f_A$ and $f_B$ of from squaring circuits, SQA and SQB, respectively, through lines 61 and 62, respectively. As shown and preferred in FIG. 3, the C.S.C. cycle suppressor also receives, in parallel the driving signals for the second stage, $MA_n$ and $MB_m$ of the counter, $NA_i$ and $NB_j$ respectively, these signals being provided in parallel from $AN_l$ through line 47' and from $BN_l$ through line 48' to the cycle suppressor C.S.C. Cycle suppressor C.S.C. also receives the signals corresponding to the last phase (terminal count) of counters $NA_i$ and $NB_j$ via lines 200 and 201, respectively, in order to sample the comparison in the last phase of each time N. The cycle suppressor device C.S.C. in turn provides inhibit signals which are applied as a feedback to the inputs of the NAND gate $A_N$ and $B_N$, respectively, through lines 70 and 72, respectively. On the other hand decoders DECOD. A and DECOD. B supply "one output out of L+1" (via 73, 74) suitable for selecting in an independent manner the reset and the set states, respectively of one out of the L+1 flip-flops contained in register network RCF to which the pulse coming from NAND gates AND and, BND, respectively, is supplied through the appropriate line $77_1$, $77_2$, $77_3$, $77_L$ or $78_1$, $78_2$, $78_3$, $78_L$, respectively. The output signals from RCF are fed through the appropriate line $80_1$, $80_2$, $80_L$, to a convertor generator CGCM haVing the monotone characteristic which provides an output voltage $Vu$ having the shape of the function shown in FIG. 1. There is a number of sophisticated circuits able to behave as described above, one such possible embodiment being shown in FIG. 3 and described in greater detail hereinafter.

Referring now to FIG. 3, the two signals to be compared $f_A$ and $f_B$ (see also FIG. 4) appear at the comparator device input according to the invention on lines 1 and 2 as pulse trains and enter the two gates $A_N$ and $B_N$ where they are ANDed with the enable signals. The output signal from $A_N$, $Cl_A$, is applied through line 13 to the first stage of the counter chain $NA_i$ and, in parallel through line 5 to one input of a gate $PA_n$ whose other input is the $NA_i$ chain signal $NA_K$ and whose output is provided as one input to the register consisting of L+1 flip-flops ($FL_0$, $FL_l$ . . . $FL_L$), which corresponds to the register network RCF of FIG. 2. Similarly, the $Cl_B$ signal output from gate BN is applied through line 4 to the first counting stage of chain $NB_j$ and, in parallel, through line 6 to one input of a gate $PB_N$ whose other input is the $NB_j$ chain signal and whose output is provided as another input to flip-flop register $FL_0$, $FL_l$, . . . $FL_L$ (corresponding to register network RCF of FIG. 2). The output signal $NA_K$ is fed in parallel through line 7 to NAND gate $A_{NI}$ which also receives input pulse signal $f_A$ through lines 11 and 11'. Similarly, the output signal $NB_K$ is fed in parallel through line 8 to NAND gate $B_{NI}$ which also receives input pulse train $f_B$ through lines 12 and 12'. As was previously mentioned, the $NA_K$ output signal is also fed in parallel through line 9 to gate $PA_N$ together with the $Cl_A$ signal, and the $NB_K$ output signal is also fed in parallel through line 10 to gate $PB_n$ together with the $Cl_B$ signal. The output signals of gates $AN_l$ and $BN_l$, respectively, are applied to the counters $MA_n$ and $MB_m$, respectively through lines 15 and 16, respectively and to flip-flop control devices FFlA and FFlA, respectively, through lines 17 and 18, respectively. The counters $MA_n$ and $MB_n$ are formed by $\mu$ cells $a_1$, $a_2$ . . . $a\mu$ , and $b_1$, $b_2$ . . . $b\mu$ , respectively. The relation between $n$ and $m$ is similar to the relation between $i$ and $j$, i.e. $n, m = 0$, 1 and 2 . . . $L$, where $L = 2\mu - 1$, $\mu$ being the number of flip flops existing in each of the above counters. The control devices FFlA and FFlB are contained in the cycle suppressor circuit C.S.C. of FIG. 2 and are both supplied with a signal $\overline{CFR}$ through lines 20 and 20', which signal is the output of a NAND gate AC, which gate AC is fed with the following three input signals:

a. the $NA_K$ output signal (last state of $NA_i$ counter) through line 9;

b. the $NB_K$ output signal (last state of the counter $NB_j$) through line 10; and c. the output signal of comparator COMP. which compares the states of counters $MA_n$ and $MB_n$.

It is useful to anticipate here that the signal outgoing from comparator COMP. is a pulse high during the time for which the two counters $MA_n$, and $MB_n$ indicate the same number, hence making the two decoders DECOD. A and DECOD. B enable the respective input (set or reset) on the same cell. In addition to signal CRF, device FF1A is supplied with the output signal of gate $\overline{A_{NI}}$ through line 17. Similarly, FFlB receives both the $\overline{CRF}$ signal and the gate BNl output signal through line 18. The output signal $CFR_A$ of FFlA is provided through line 21 to NAND gate BB which receives through line 21' the signal $NB_o$ which is the "0" state of the counter $NB_j$. Similarly, the output signal $CFR_B$ of flip flop FFlB is provided to NAND gate AA through line 22 which receives through 22' the signal $NA_o$ which is the "0" state of counter $NA_1$.

The output signal $CA_o$ from gate AA is supplied through line 23 to the D input of flip-flop FF2A which receives the original pulse train $f_A$ at its clock input via line 23. Similarly, the output signal $CB_o$ from NAND gate BB is supplied through line 24 to the D input of flip-flop EF2B which receives the original pulse train $f_B$ at its clock input via line 24'.

The four flip-flops FF1A, FF2A, FF1B, FF2B, together with the three NAND gates AA, BB and AC, represent, in this case, the preferred embodiment of the cycle suppressor circuit C.S.C. of FIG. 2. The output signal from FF2A and FF2B respectively is supplied, or fed back, as a cycle suppressor signal CA and CB, respectively, through line 33 and 34, respectively, to the input of NAND gates $A_N$ and $B_N$, respectively. As it may be seen in the lower half of FIG. 3, the different outputs $MA_0$, $MA_1$, . . . $MA_L$ of decoder DECOD. A are selected from the configuration $a_1$, $a_2$ . . . a $\mu$ coming from the counter $MA_n$ through lines 60, $60_1$ . . . $60\mu$ . Similarly, the different outputs $MB_0$, $MB_1$ . . . $MB_L$ are selected from the configuration $b_1$, $b_2$ $b\mu$ of the counter $MB_m$ through lines 70, $70_1$ . . . $70\mu$ . The network of cells RCF in common on channels A and B consists of a series of flip-flop latches $FL_0$, $FL_1$ . . . $FL_L$ whose true and false outputs are represented respectively by: $L_0 - \overline{L}_0$, $L_1$, $\overline{L}_1$, $L_L - \overline{L}_L$. The reset pulse to the cells is enabled (on one cell at a time) by DECOD. A and is transmitted on line 90 which is connected to the output of gata $PA_N$ providing the coincidence function $\overline{Cl}_A \cdot NA_K$. In a similar manner the set pulse on the cell selected by DECOD. B is transmitted through line 100 which is connected to the output of gate $PB_N$ where the coincidence function $\overline{Cl}_B \cdot NB_K$ is performed. It is useful to notice that the comparison between the two counters $MA_n$ and $MB_n$ is helpful for avoiding the simultaneous enabling of the same cell by DECOD. A and DECOD. B and this is obtained by suppressing an input pulse at the counter going at higher speed at the moment when it is going to overpass the other one.

The output of each flip-flop goes on a common line 110 through respective inverters (FIG. 3) to provide the respective output signals $F_0$, $F_1$, . . . $F_L$ which, through resistors $R_0$, $R_1$, . . . $R_L$, modulate a current on line 110 proportional to the number of "zeros" contained in the register $FL_0$, $FL_1$ . . . $FL_L$. The absorbed current through line 110 comes from the emitter of transistor TR and will cause a substantially equivalent collector current hence supplying a voltage drop on R proportional to the number of "zeros" contained in the register RCF. A capacitor C has the function of filtering the collector voltage before it enters the circuit CGCM which is the converter-generator of the non-decreasing monotone characteristic CM illustrated in FIG. 1.

Figure 4:
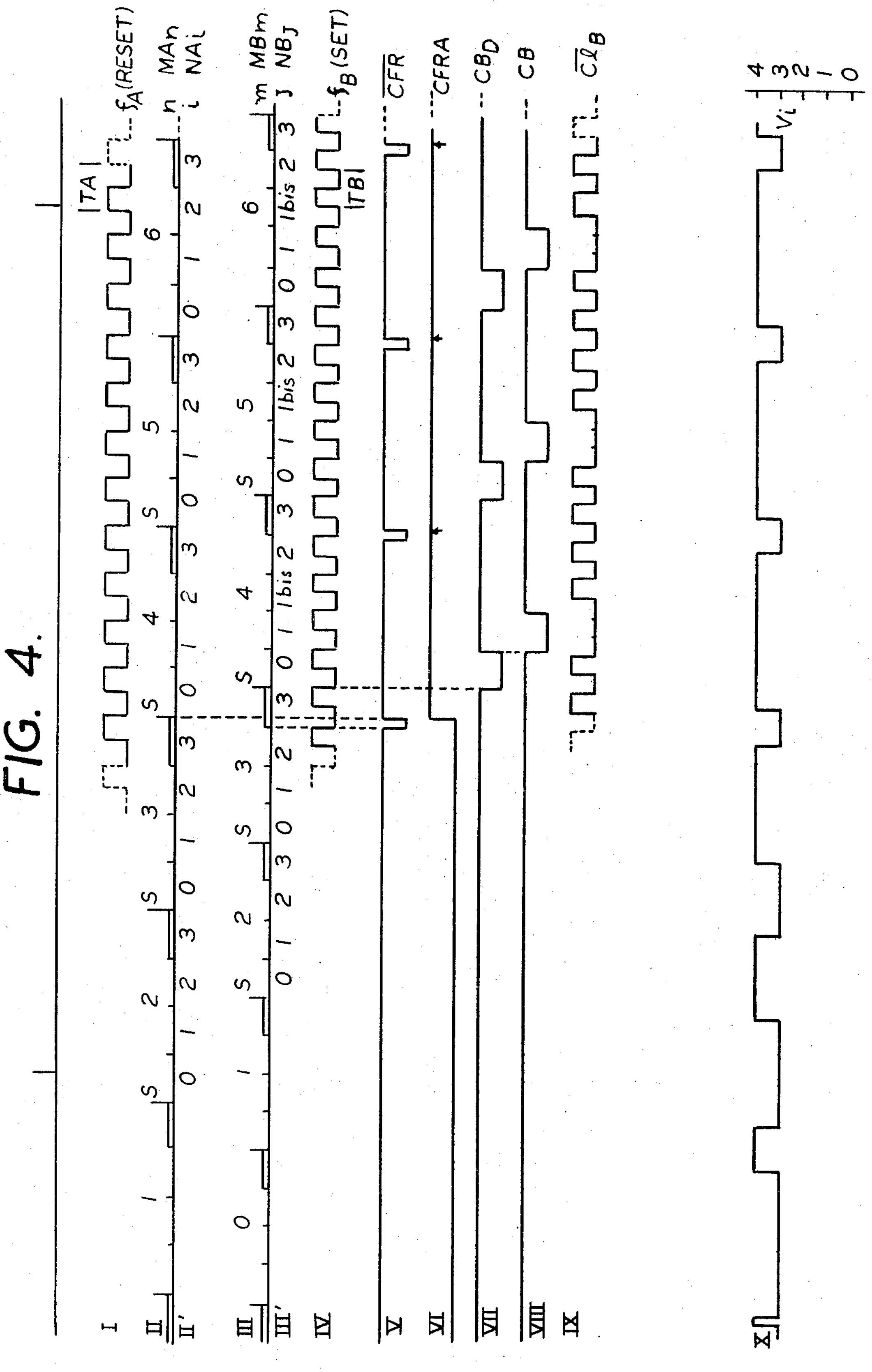
FIG. 4 is a timing diagram illustrative of the different signals produced and activated by the device of FIG. 3; and FIGS. *5a*, *5b* and *5c* are graphical illustrations of the steps through which the monotonic non decreasing characteristic is generated in correspondence to the final output stage.

Preferably CGGM is simply an amplifier with sharp interdiction and saturation so as to cut the $V_i$ waves corresponding to the condition in which one of the inputs is constantly faster than the other such as a limiter or clipper of the type described in Vol. 37 of BSTJ, July, 1958, page 1,024. The output voltage $Vu$ shown in FIG. 1 is collected at the output of CGCM. FIG. 4 shows the various signals present in the different sections of the device of FIG. 3. On line I there is the pulse train represented by signal $f_A$ while the pulse train $f_B$ is represented on line IV.

The pulses which operate the reset on the cell selected at that time through DECOD. A each time are derived from $f_A$ and, the set pulses which operate the set on the cell selected by DECOD. B each time are derived from $f_B$. In line II ARE SHOWN THE STATES OF THE TEMPORIZATION CHAIN $NA_i$ while on line III are shown the $NB_j$ states wherein, $i$ and $j$ may assume the following values:

$$\left.\begin{array}{l} i=0,1,2,\ldots K \\ j=0,1,2,\ldots K \end{array}\right\} \quad \text{where } K=2^{\gamma}-1$$

where $\gamma$ indicates the number of counting cells forming each counter $NA_i$ and $NA_j$. In a practical case where only two cells are employed, $K$ will be equal to 3 whereby counters $NA_i$ and $NB_j$ will each have a value of 4 running through the states from 0 to 3. These states of N counters $NA_i$ and $NB_j$, termed $NB_O$, $NB_1$, $NB_2$, $NB_3$, are illustrated in line III of FIG. 4. Every time the state $NA_3$ appears, counter $MA_n$ receives an advancing pulse (non represented) and counts up. The $MA_n$ states are $2\mu$ (analogous to those of $NA_i$).

Lines II and III represent in time succession the states crossed by counters $MA_n$ and $MB_m$, respectively, whose last part is evidenced by the symbol S in FIG. 4.

The comparator COMP compares the states of the $MA_n$ and $MB_n$ counters. When, as illustrated in FIG. 4, a coincidence occurs between the two counters during the $NA_K$ and $HB_K$ phases, the output of NAND gate AC goes to zero as does the signal $\overline{CFR}$ line V of FIG. 4) meaning that both the two-stage counters have the same content. In the case shown in FIG. 4, we can see that FF1A only will follow the signal $\overline{CFR}$ hence making the transition represented on line VI. The clock input of FF1A is activated by the falling edges of $f$ (see line I) selected by $NA_3$. After this the first state $NB_o$ that we meet on line III wil produce a level "zero" on signal $CB_D$ represented on line VII and within the end of $NB_o$ the $CB_D$ level will be transferred by an $f_B$ clock into FF2B as signal CB going to zero (represented on line VIII) while the $CB_D$ signal goes to "one".

The signal CB "zero" is fed back to the input through line 34 of FIG. 3 and suppresses a $\overline{Cl}_B$ pulse as we may see on line IX of FIG. 4. The suppression of such a pulse stops the advancement of the counter $NB_j$ which repeats the $NB_1$ state on line III', as shown by state $NB_{1bis}$. In this manner, the counter $MB_m$ excited by pulse train $f_B$, is recognized as the faster one and is prevented from overpassing the $MA_n$ counter by suppressing a pulse on its input. Hence, during all the time the signal $f_B$ is faster than $f_A$, there will be a periodical suppression of some $f_B$ pulses, thus preventing $MB_m$ from passing $MA_n$. The $V_i$* voltage represented on the line X of FIG. 4, shows the behavior of the voltage on the collector of transistor TR in the absence of capacitor C. As soon as the path B is gaining cycles with respect to A, the number of flip-flops FL in the "1" state grows and the $V_i$* voltage will oscillate between always higher levels until a level corresponding to all "1s" is reached. In FIG. 4 $V_i$* is illustrated as varying between levels 3 and 4 hence showing that one counter is attempting to pass the other one. Whenever such a condition is detected by means of the above described mechanism, a pulse on the faster path is cancelled. In this way $V_i$* will continue to vary between the two higher levels, until the faster input becomes slow and looses at least one cycle with respect to the other one.

In the embodiment illustrated in FIG. 3, the capacitor C performs a filtering of $V_i^*$ and the behavior of $V_i$ is as shown in FIG. 5a, where it can be seen that with $f_A$ near to $f_B$ we may obtain a saw-tooth working in the extreme sides which will have to take place outside the linear region of the CGCM amplifier.

The saw-tooth period depends on the difference between the two frequencies.

LIMITATIONS

The maximum difference between the two $f_A$ and $f_B$ frequencies must be such as to produce a mutual sliding less than once every two cycles, otherwise the risk occurs of not detecting the pass condition when one of the signals is gaining one whole cycle between two states $N_K$ or sampling intervals.

The preferred conditions for accomplishing this are:

$$\frac{2^\gamma-1}{2^\gamma} f_A < f_B < \frac{2^\gamma}{2^\gamma-1} f_A$$

The invention has been described for clarity purposes with reference to the embodiments represented in the drawings. Obviously the invention is not limited by said embodiments but may undergo change and modifications which being obvious to the person skilled in the art fall automatically within the broader scope of this invention.

Similarly the device and system according to the invention can be used for purposes different from those above mentioned.

What is claimed is:

1. A system for discriminating frequency and measuring a phase difference between a pair of periodic signals each having an associated frequency and phase comprising means for obtaining first and second pulse trains from said first and second periodic signals, respectively; first and second gating means connected to said pulse train obtaining means for respectively controlling the provision of said first and second pulse trains from said pulse train obtaining means; first and second counting chain means respectively connected to said first and second gating means outputs for respectively providing a time framing to said first and second pulse trains to provide time framed output signals therefrom; common comparator means connected to said first and second counting chain means outputs; first and second decoder means connected in parallel to said first and second counting means outputs respectively; cycle suppressor means connected to said comparator means output and to said first and second pulse obtaining means outputs and said first and second gating means outputs for receiving signals corresponding to the last count of said first and second counting chains for sampling the comparison between said first and second signals in the last count of each sampling interval, said cycle suppressor means output beng connected in a feedback path to said first and second gating means inputs for providing inhibit signals thereto to inhibit the provision of said first and second pulse trains to said first and second counting chain means respectively; bistable means having an input connected in common to said first and second decoder means outputs and to said first and second gating means outputs; and converter means connected to said bistable means output for providing an output signal whose potential value varies in response to the phase difference between the first and second periodic signals in accordance with a non-decreasing monotonic function having a predetermined range of values between a maximum and a minimum value of phase difference wherein the output value of the potential value of said output signal is linearly related to phase difference until said maximum value is obtained, said output potential value remaining constant for phase differences greater than the phase difference corresponding to said maximum value and said output potential value is linearly related until said minimum value is obtained, said output potential value remaining constant at said minimum value for phase differences less than the phase difference corresponding to said minimum output potential value.

2. A system in accordance with claim 1 wherein said converter means provides a linearly varying potential value for said output signal for a maximum phase differential having a value which is sufficient to produce a mutual sliding of said first and second signal frequencies less than once every two cycles to enable the detection of a pass condition when one of said signals is gaining one whole cycle between two sampling intervals.

3. A system in accordance with claim 2 wherein said converter means non-decreasing monotonic function is defined by the expression $$\frac{2^\gamma-1}{2^\gamma} f_A < f_B < \frac{2^\gamma}{2^\gamma-1} f_A$$

where $f_A$ represents the frequency of said first signal and $f_B$ represents the frequency of said second signal, and $\gamma$ represents the number of counting cells in said counting chain means.

* * * * *